United States Patent [19]
Binder et al.

[11] 3,879,705
[45] Apr. 22, 1975

[54] MOTOR VEHICLE TEST APPARATUS HAVING FACILITIES FOR SIMULTANEOUSLY TESTING THE DRIVING CAPABILITY OF A VEHICLE OPERATOR

[75] Inventors: Hans Binder; Helmut Luthe, both of Wolfsburg, Germany

[73] Assignee: SWF-Spezialfabrik Fur Autozubehor Gustav Rau GmbH, Bietigheim, Germany

[22] Filed: Nov. 16, 1972

[21] Appl. No.: 307,041

[30] Foreign Application Priority Data
Nov. 19, 1971  Germany............................ 2157377

[52] U.S. Cl.................... 340/53; 180/99; 307/10 R; 340/223; 340/279
[51] Int. Cl............................................. B60r 25/04
[58] Field of Search............ 340/52 R, 53, 223, 63, 340/64, 279, 27 R; 317/134, 139; 307/10 R, 10 AT; 180/99, 82, 114; 290/114, 37 R, 38 R

[56] References Cited
UNITED STATES PATENTS

| | | | |
|---|---|---|---|
| 3,544,961 | 6/1967 | Pasley et al. | 340/53 |
| 3,587,950 | 6/1971 | Haigh et al. | 317/134 |
| 3,707,710 | 12/1972 | Adler et al. | 180/99 |
| 3,723,967 | 3/1973 | Atkins et al. | 307/10 AT |
| 3,729,059 | 4/1973 | Redmond | 180/82 |
| 3,755,776 | 8/1973 | Kotras | 340/63 |

Primary Examiner—John W. Caldwell
Assistant Examiner—Joseph E. Nowicki
Attorney, Agent, or Firm—Toren, McGeady and Stanger

[57] ABSTRACT

A driver's alertness and a vehicle's accessories are tested by successive switches that operate various lamps, wiper blades, and other electrical devices on the vehicle. The switches are connected so that each switch, when operated, enables a succeeding switch. Thus all the switches can be operated only in a given sequence. The last switch enables the vehicle's starter. A series timer disables the first switch if the switches are all not operated within a given time and sequence after a starting key has been used. A second timer disables the system for about 30 minutes after three unsuccessful attempts to operate the switches in sequence during the given period. An override enabling switch enables the starter for 10 minutes after the vehicle has stalled in traffic to allow restarting. An alternative embodiment sets off an alarm instead of disabling the starter if the switches are not operated in sequence within the given period.

14 Claims, 4 Drawing Figures

MOTOR VEHICLE TEST APPARATUS HAVING FACILITIES FOR SIMULTANEOUSLY TESTING THE DRIVING CAPABILITY OF A VEHICLE OPERATOR

BACKGROUND OF THE INVENTION

This invention relates to test apparatuses, particularly for testing a driver to determine whether he is sufficiently alert to drive a motor vehicle.

German Pat. No. 318,434,63c/70 and an article in "Automobil Revue" No. 28 of June 24, 1971 illustrate arrangements which permit the engine of a motor vehicle to be started only if the driver is capable of carrying out a test program that involves operating various switches in a given order under certain timing conditions. The purpose of the test is to prove that the driver is sufficiently alert to drive. The arrangement described in the beforementioned journal is applicable not only to motor vehicles but also to airplanes and potentially hazardous machines such as trains.

These known systems are used with the assumption that a drunken driver, or a driver whose driving capacity is adversely influenced by age or ill health is incapable of passing or performing the test program built into the vehicle and will thus will be unable to start the engine of the vehicle. In vehicles with internal combustion engines such a safety system enables a circuit necessary for starting the engine only when specific steps are performed in a pre-programmed order. The safety switch can control an ignition device, such as a spark plug or a glow plug, or can regulate the circuit of a starter.

The aforementioned devices, as well as the theft preventing devices described in U.S. Pat. No. 3,524,989, and German Utility Model No. 1,804,205,63 c/71, serve only one purpose. That is it prevents incapable, incapacitated, or otherwise unauthorized persons from starting the engine.

However, the traffic safety of the motor vehicle depends not only on the condition of the driver, but also on the condition of the vehicle itself. The aforementioned systems either fail to perform such tests on the motor vehicle, or they require extensive additional testing.

An object of the invention is to overcome such difficulties.

Another object of the invention is to prove such test systems.

SUMMARY OF THE INVENTION

According to a feature of the invention, these objects are attained in whole or in part by causing a number of normally disabled switches to enable each other in a specific sequence so that when they are actuated in that sequence the machine to be started is enabled. Each actuated switch operates one or different accessories or vehicle parts, such as headlights, position lights, signal lamps, warning lamps, windshield wipers, or safety belt signals.

According to another feature of the invention, each of the switches latch after being enabled and actuated.

According to another feature of the invention, the switches are controlled by the usual control knobs appropriate to the different accessories or vehicle parts such as the lamps, windshield wipers, etc. These knobs are located in their usual positions on the dashboard. These control knobs or switches are not combined at any other specific location.

According to another feature of the invention, the normally disabled switches form a safety system which is initially actuated. Normally disabled switching means cooperate with the switches to disable the overall system. Timing means respond to actuation of the system to enable the switching means for a perdetermined time period so that the system is capable of starting an engine or other machinery only if the switches are actuated in their proper sequence within the time period established by the timing means. According to one embodiment of the invention the timing means enables the switching means for ten seconds.

According to another feature of the invention, counting means respond to initial actuation of the system and disable normally enabled second timing means after a predetermined number of actuating attempts. The second timing means normally enables the system, that is the second timing means allows the system to start the engine if the switches are actuated in the predetermined order. However, in response to the counting means, the second timing means disables the system for an extensive period such as 30 minutes. This prevents the driver from making too many successive unsuccessful attempts to actuate the proper switches in the proper order within the prescribed time. It effectively forces the driver to wait 30 minutes before making another attempt, such as a fourth attempt.

According to another feature of the invention, enabling of the starting device by the system actuates time switch means which remain closed until the vehicle or machinery is no longer operating. The time switching means remains closed and shunts the entire safety system for an additional time period of 10 minutes. This allows a driver or other machine operator, whose machine has accidently stopped, to restart the machine without going through the test procedure.

According to another feature of the invention, blocking means respond to attempted actuation of a later one of the switches in the sequence before actuation of one of the earlier switches to disable all of the switches and compel restarting of actuation of the switches.

According to another feature of the invention, the system, rather than disabling the operation of the engine or other machine being operated, produces a flashing alarm.

According to another feature of the invention, the alarm and disabling action of the machinery or engine occurs simultaneously.

These and other features of the invention are pointed out in the claims. Other objects and advantages of the invention will become obvious from the following detailed description when read in light of the accompanying drawings.

DESCRIPTION OF PREFERRED EMBODIMENTS

Figure 1:
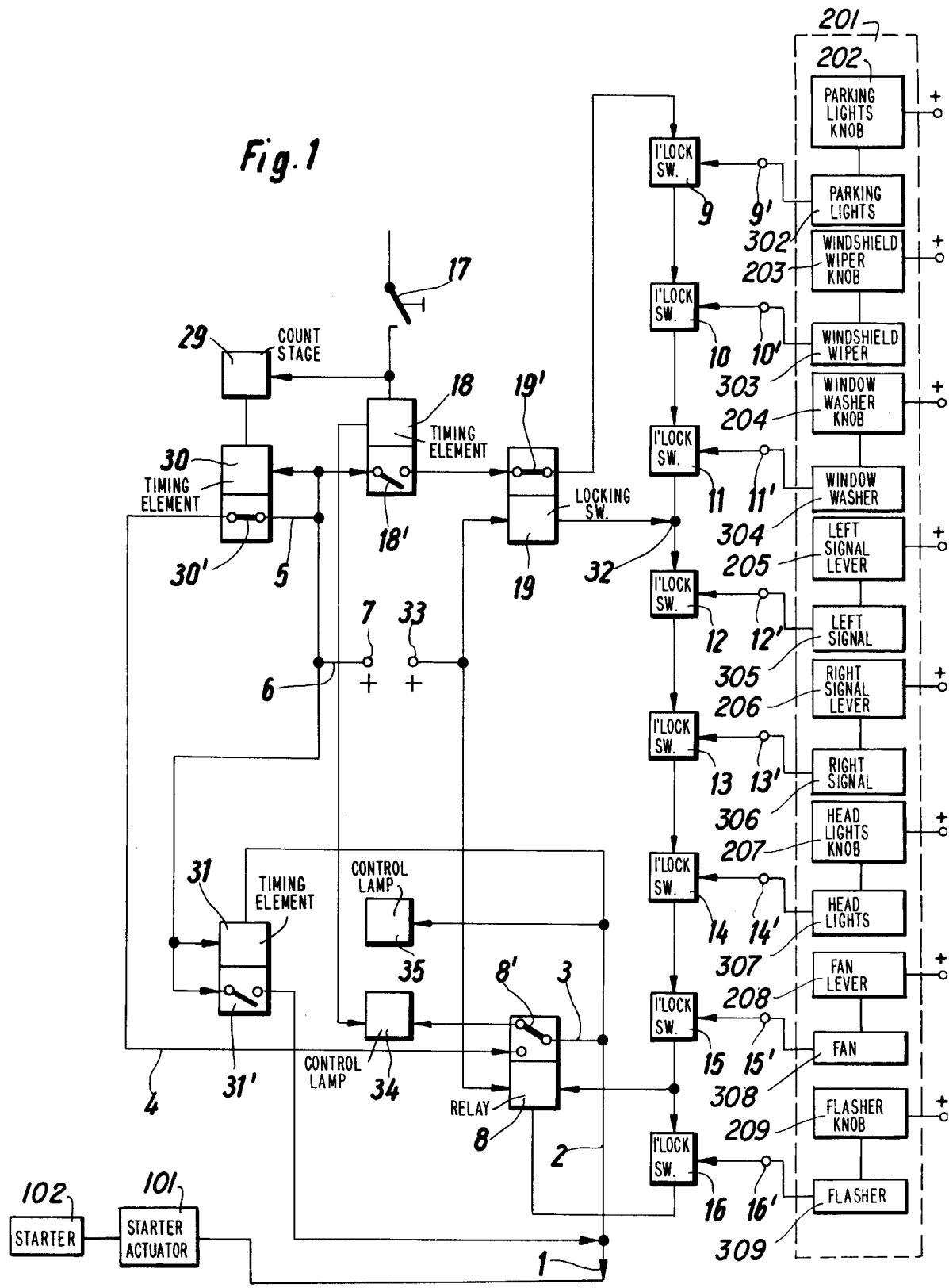
FIG. 1 is a schematic illustration of a safety system embodying features of the invention.

In the embodiment of FIG. 1 the circuit necessary for starting the internal combustion engine is represented by a starter actuator 101 whose input is coupled to the line 2 in the direction of the arrow 1 and whose output controls a starter 102 in a conventional manner. The circuit necessary for starting the engine also contains four lines 3, 4, 5, 6, of which the last is connected to the terminal 7 carrying a positive potential. A reversing contact 8' of the relay 8 is essential for the closing of this circuit. The relay 8 is actuated only when all steps or stages of a safety switch SS, described more fully below, have been actuated successively according to a fixed program.

These stages of the safety switch SS are composed of individual switches 9 to 16 connected in series in such a way that actuation of any one switch, e.g. 10, connects power to the following switch, e.g. 11, and sets it for subsequent acutation. It is thus necessary to actuate the actuating means connected to the control terminals 9' to 16' of the switches 9 to 16 in a given order, in one direction from the top to the bottom as shown in FIG. 1. According to the invention, the actuating means connected to the terminals 9' and 16' serve to start devices of a motor vehicle, for example, for turning on the headlight, the windshield wiper, signal lamps or other devices. Illustratively, a schematically shown passenger compartment 201 of the vehicle is provided with a variety of standard accessory switches 202 – 209 in the form of knobs and levers that individually establish energizing paths to corresponding standard accessories 302 – 309, respectively. Such switches 202 - 209 also establish energizing paths to each of the control terminals 9' – 16' for energizing each such terminal when the associated one of the accessories is operated.

The circuit not only requires the driver to operate these devices, and thus of the various switches 9 to 16 in a given order, but also to meet certain time conditions. For this purpose actuation of a starting key 17 energizes a first timing element 18 which closes its contact 18' for a given period, for example ten seconds. Contact 18 closes a circuit from the positive terminal 7, through a normally closed contact 19' of a locking switch 19 of the circuit, and through the switches 9 to 16, to the relay 8. All individual switches 9 to 16 must thus be actuated in the predetermined order during the time that element 18 is closed.

Figure 2:
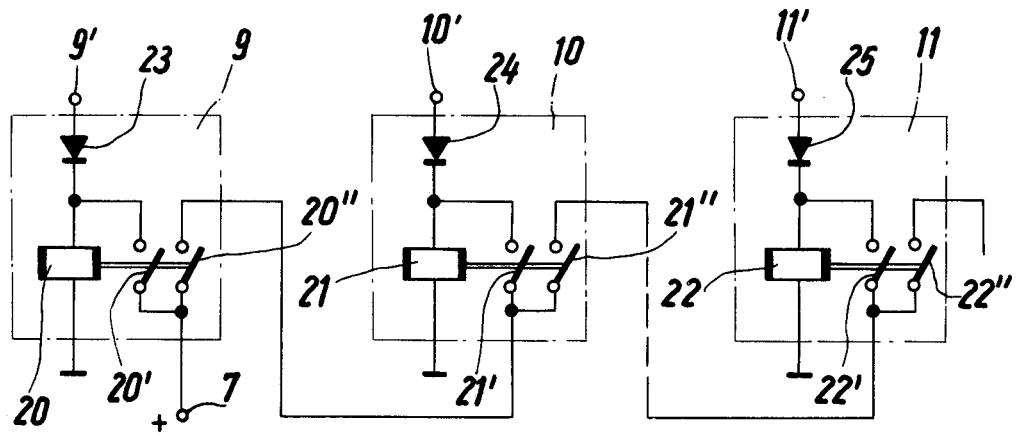
FIG. 2 is a schematic illustration of details of portions of the circuit in FIG. 1.

As pointed out above, the switches are operated by the actuating means connected to the control input terminals 9' to 16' which simultaneously actuate the vehicle's accessories like lamps etc. Specifically potentials arrive at the terminals 9' and 16' to actuate the switches and produce a through-connection in each of the switches 9 to 16. Details of switches such as 9 to 16 are shown in FIG. 2. Each switch includes relays such as 20, 21, 22 etc. in series with diodes 23, 24, 25 etc. When the diode 23 is rendered conductive by a predetermined potential at the terminal 9', the relay 20 pulls in its two ganged contracts 20' and 20''. One of the contacts latches the relay 20 so that it holds itself on. At the same time the other contact connects power to set the following relay 21. When this relay is also excited by a predetermined potential at its control terminal 10', it closes its two contacts 21' and 22'' so that the cycle already described in step 9 now repeats itself in switch 10. The same holds true for the following steps.

Operation of the actuating means connected to the various terminals 9' and 16' in correct order and within the period determined by the first timing element 18 results in the excitation of the relay 18, as indicated above. It thus establishes the necessary connection of the starting switch with the positive terminal 7 over the reversing contact 8'.

Figure 3:
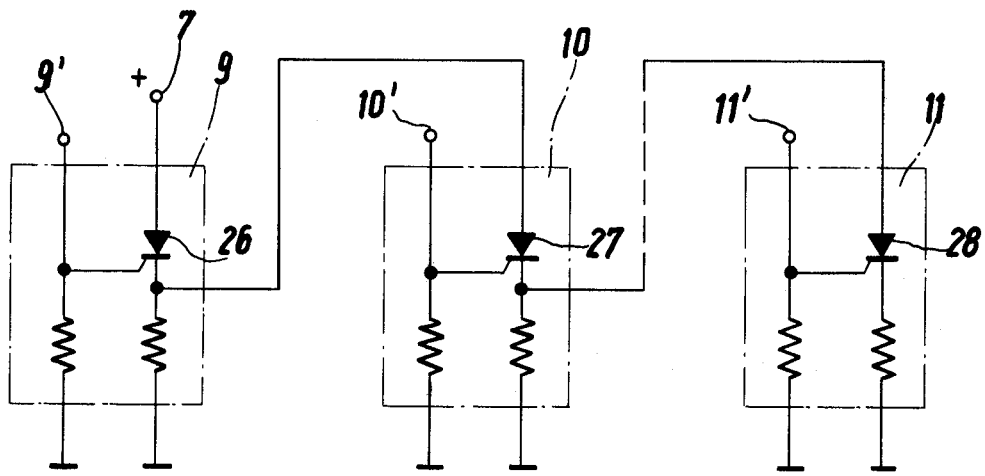
FIG. 3 is a schematic drawing illustrating another embodiment of the details of the circuits shown in FIG. 1.

In the embodiment shown in FIG. 3, the individual switches 9 to 16 utilize thyristors. The individual thyristors 26, 27, 28 etc. are rendered conductive by suitable potentials on the control terminals 9', 10', 11' etc.

Here too the last switching stage in the series connection energizes the relay 8.

In addition to exiting the first timing element 18, the starting key 17 is connected to the counting stage 29, In this embodiment, the stage 29 is trivalent (it counts to 3) and its output energizes a second timing element 30 having a contact 30'. After the counting stage 29 has received three input pulses, that is, after the starting key 17 has been actuated three times, stage 29 furnishes the second timing element 3 with an output pulse that actuates the latter. The contact 30' of the timing element 30 now interrupts the circuit between the lines 4 and 5, i.e., between the positive terminal 7 and the contact 8, so the latter cannot connect the terminal 7 to the line at arrow 1 even when the operation succeeds in a new attempt to excite the relay 8 and thus to reverse the contact 8'. The auxiliary device composed of the counting stage 29 and the second timing element 30 serves to prevent the start of the engine for a given time such as 30 minutes after the driver has made three unsuccessful attempts to operate the switches 9 to 16 sequentially within the period established by element 18.

Suitable means permit repeated starting attempts where necessary, without constantly repeating the test program. For example, if a vehicle is stuck in traffic it is frequently unfeasible to burden the driver with the repeated execution of the same test program. In the embodiment of the invention shown in FIG. 1, these means constitute a third timing element 31 with the contact 31' which shunts the safety switch, i.e., the reversing contact 8', for 10 minutes after the vehicle has stopped. During this time, the contact 31' couples the starting switch connected at the arrow 1 directly to the positive terminal 7.

Finally, FIG. 1 includes an additional obstacle for the driver being tested, namely the locking stage or relay 19 with its contact 19' in the control circuit. The exciting circuit for the locking stage 19 extends from a tap 32 between the individual switches 11 and 12 to a positive terminal 33, which carries a voltage only when the starting switch is actuated. The potential tap 32 thus divides the switching steps into two groups, of which the first group contains the switches 9, 10, 11. The second group contains the switches 12 to 16 and, in this function of the circuit, the starting switch.

The potentials at 32 and 33 for actuating the locking stage 19, are selected so that this relay 19 is actuated and opens its contact 19' when the starting switch is actuated before the test program has been properly executed up to the through-connection of the switch 11. If the starting switch is thus actuated before step 11 is operated, the control switch is interrupted. In addition, a control lamp 34 indicates that the test has not been passed. Another control lamp 35 signals the operation of the starter.

Of course, the locking stage 19 can also be connected so that its potentials are tapped at other points of the chain formed by the stages 9 to 16 at the starting switch.

According to another embodiment of the invention, the circuit is supplemented so that voluntary and involuntary changes of the test program can be effected. This prevents the operator to be tested from becoming used to the test.

Figure 4:
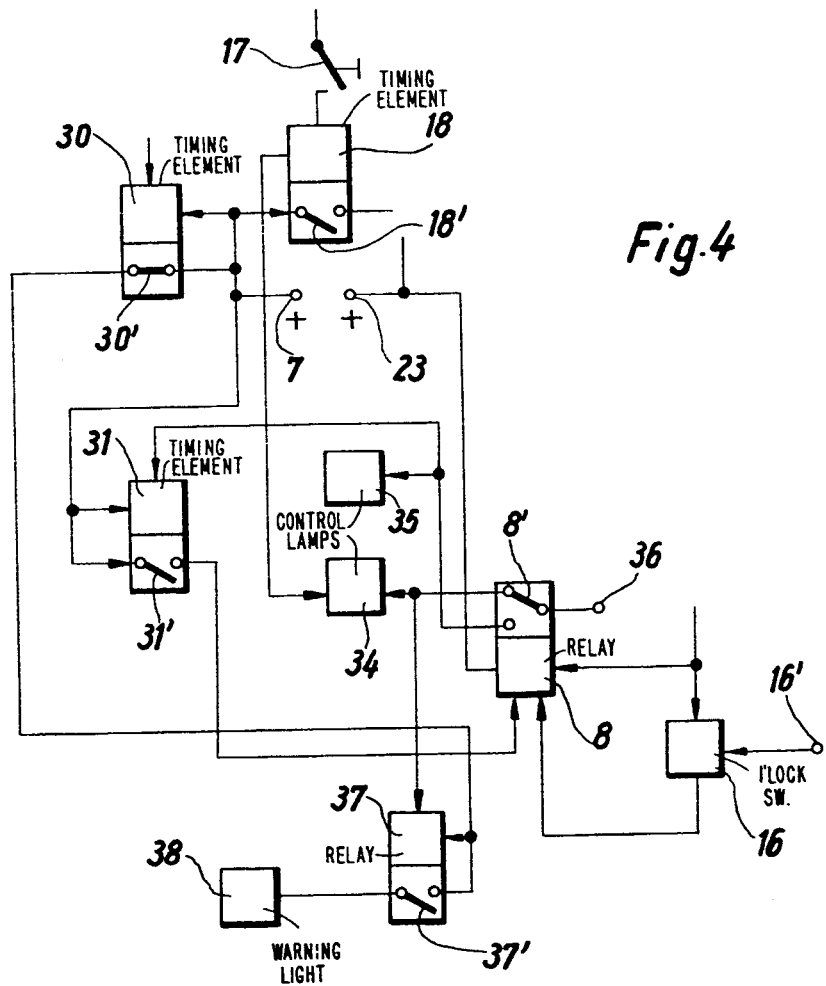
FIG. 4 is a schematic diagram illustrating another circuit embodying features of the invention.

FIG. 4 shows a variation of the invention which permits the engine to be started even without going through the test program, but with an automatic indication. In a motor vehicle this may mean, for example, that all four flashing lights are actuated. This embodiment of the invention is characterized by the fact that the safety switch is arranged, instead of in the circuit necessary for starting the engine, in the circuit of a warning signal transmitter, particularly for flashing lights. When a switch for starting the engine is actuated without previously actuating the steps of the safety switch in the preprogrammed order, the circuit of the warning signal transmitter is closed.

In FIG. 4 only the changes made in the circuit according to FIG. 1 are represented. Otherwise the circuit is identical with that according to FIG. 1, so that the same reference numbers are used for parts shown in FIG. 1.

With the engine running, a positive potential arrives from the dynamo regulating switch at the terminal 36. In FIG. 1 this was part of the circuit for the starting switch. When the test program is not or only incompletely passed, the reversing contact 8' remains in the series position shown, so that a positive potential appears at a switching stage 37. If a positive potential also arrives from the timing element 30 at the switching stage 37, it reverses its contact 37' and closes the energizing circuit for the warning light 37.

As can be seen, the invention, and as embodied in the drawings, permits simultaneous performance of two tests, one on the driver, and one on portions of the automobile. Effectively the driver's reflexes and alertness are tested. The operation of various accessories and illuminating equipment is also tested. The two tests have no influence on each other. Moreover, the invention does not require any extensive amount of additional components for testing the motor vehicle or other machine being operated. Rather, existing knobs and switches which normally control the various accessories and devices can be used for testing the capacity or incapacity of the operator. In a motor vehicle, the various knobs and switches are arranged in their usual location on the steering wheel or dashboard. This adds a desired complexity to the test of the driver.

As stated, in addition to testing the operator, the invention permits testing of the different devices or accessories of the machine or motor vehicle. The types of accessories or devices that can be tested in this manner include illuminators such as headlamps, position lights, signal lamps, and warning lamps, as well as windshield wipers and the type of safety belts which are provided with electric circuits and which produce an alarm when the safety belt is not being used. The more comprehensive the test program for testing the machine or motor vehicle, the more thorough is the test of the operator. This is so because the complexity of the driver test increases with the number of devices being tested.

Obviously, a great number of systems may embody the invention. FIG. 1 illustrates a particularly desirable and simple arrangement that offers a number of extra safety advantages. As shown in FIG. 1, the steps of the safety switch SS are in the form of individual switches 9 to 16 arranged in series to form a control circuit which is in turn enabled for a given period of time, such as 10 seconds, by the first timer or timing element 18 after the starting contact 17 has been actuated. The timing element 18 contains a relay with a contact that closes the circuit needed for starting the engine or other machine. If the test program established by the switches 9 to 16 is not satisfactorily completed by the operator within the test period, the 10 seconds mentioned above, the first timing element disables the control circuit.

To make sure that the operator or driver cannot repeat the starting process indefinitely, and thereby eventually be certain to get the engine running, the three-bit counting stage 29 is connected to the starting contact 17. Three actuations of the starting contact or key 17 in order to initiate performance of the test, produces an output which appears at the input of the second timing element 30 with its normally closed contact. The signal opens a contact for a predetermined time, and during this time disables the safety starting system by preventing current flow to the contact 8'. The counting stage 29 thus insures that the entire circuit is blocked or disabled for a predetermined time, such as 30 minutes, after three starting attempts have failed.

The invention further avoids disabling of the starting system or the ignition cicuit of the machine or vehicle in undesired circumstances such as when a vehicle stalls at a traffic crossing. Here it is necessary to start the engine again as soon possible without going through the entire test program. For this reason FIG. 1 contains a shunting contact 31 that closes a circuit which by-passes the system SS once the test program has been satisfactorily completed. That is to say, the contact 31' is pulled in once the test has been satisfactorily completed. The third timing element or timer 31 which pulls in or closes the contact 31' during satisfactory operation of the automobile, continues to hold the contact 31' in for a predetermined time such as 10 minutes, after the vehicle has stalled.

The invention as embodied in FIG. 1 furnishes a means of making the test procedure more difficult, which is especially advisable when the number of steps and switches in the system is comparatively small. This is accomplished by passing the energizing current from the terminal 7 to the switches 9 to 16 through the contact 19' of the locking stage. The stage 19 receives its energizing current from the terminal 33 and the potential between the first and second groups. Thus the contact of the locking stage or latching stage 19 interrupts the control circuit if the stages or switches of the second group are actuated before the stages or switches of the first group. The second group of stages or switches may, for example, be actuated by a starting switch of the engine so that the entire test program has to begin from the beginning if the starting switches actuated before the program for actuating the individual switches of the first groups has been passed.

Additional pilot lamps can be provided to indicate the fact that the test program has succeeded or failed.

What is claimed is:

1. In a motor vehicle provided with (a) a normally disabled activating means, (b) an interlock system for selectively enabling the activating means wherein the interlock system includes N normally unoperated first switching means (N>1) each having an enabling input together with means for connecting all the first switching means in tandem to complete an enabling path to the activating means only when the tandem-connected first switching means have been operated in a prescribed sequence, the operation of each first switching means being effective to condition the succeeding first switching means for operation so that said succeeding first switching means may be operated upon the excitation of its enabling input, and (c) normally unoperated second switching means coupled to the input one of the tandem-connected first switching means and operable in response to an initiating pulse for conditioning the first switching means for operation, the improvement wherein:

the vehicle further comprises, in combination, at least N standard, manually operated electrical accessory switches distributed in the vehicle in accessible relation to an operator of the vehicle for controlling a corresponding number of standard accessories, and means for individually coupling N of the accessory switches to the enabling inputs of the first switching means in a selected pattern so that the manual actuation of each accessory switch by the operator is effective to operate the associated first switching means when the latter is conditioned for operation; and the second switching means includes first timing means rendered effective by the initiating pulse for disabling the conditioned input one of the first switching means after a predetermined time, whereby the interlock system is prevented for enabling the activating means until the satisfactory and simultaneous completion of both a sequential testing procedure for the N accessories and the completion by the operator of N sequential manual tasks as represented by one of the above-mentioned manual switch operations.

2. Apparatus as in claim 1, further comprising an electric starter, said electric starter being responsive to said activating means.

3. Apparatus as in claim 1, further comprising an engine having an electric starter, said means activating being connected to said starter for operating said starter.

4. Apparatus as in claim 1, in which at least a portion of said accessory switches are knobs, said knobs being remotely distributed from each other.

5. Apparatus as in claim 1, wherein a plurality of said accessories include illuminating means.

6. Apparatus as in claim 1, wherein said vehicle includes a dashboard and a steering wheel and wherein a portion of said accessory switches comprise operating knobs distributed on said dashboard and said steering wheel.

7. Apparatus as in claim 1, further comprising counting means coupled to the first timing means for generating a trigger signal when a predetermined number of initiating pulses have been applied to the first timing means, and second timing means coupled to said counting means and rendered effective by the trigger signal for disabling the enabling path to the activating means for a predetermined time.

8. Apparatus as in claim 1, in which each first switching means comprises hold-in means rendered effective when said first switching means is operated to maintain said first switching means in an operated condition, whereby the associated accessory switch may immediately be released by the operator to decouple the associated accessory from the interlock system as soon as the actuation of said accessory switch is complete.

9. In a motor vehicle;

at least N standard manually operated electrical accessory switches (N>1) distributed in the vehicle in accessible relation to an operator of the vehicle for controlling a corresponding number of standard accessories;

vehicle starting control means;

circuit means coupled to said control means for energizing said control means, said circuit means including N sequentially arranged switching means each having an actuating input, said circuit means energizing said control means only when all the switching means are operated in a predetermined sequence by the energizing of their enabling inputs in a corresponding sequence;

means for individually coupling at least N of the accessory switches to the enabling inputs of the switching means in a selected pattern such that the manual actuation of each accessory switch is effective to operate the associated switching means;

first timing means coupled to said switching means and responsive to an initiating pulse for enabling an input one of said switching means and for disabling said enabled input one of said switching means after a predetermined time;

counting means coupled to said first timing means for generating a trigger pulse when a predetermined number of initiating pulses have been applied to said first timing means and;

second timing means coupled to said counting means and to said first timing means and rendered effective by the trigger pulse for disabling said first timing means to deenergize said control means.

10. In a motor vehicle:

at least N standard manually operated electrical accessory switches (N>1) distributed in the vehicle in accessible relation to an operator of the vehicle for controlling a corresponding number of standard accessories;

vehicle starting control means;

circuit means coupled to said control means for energizing said control means, said circuit means including N sequentially arranged switching means each having an actuating input, said circuit means energizing said control means only when all the switching means are operated in a predetermined sequence, by the energizing of their enabling inputs in a corresponding sequence, said switching means being divided into a first group of successive switching means and a second group of successive switching means, the first group of switching means being sequentially earlier than the second group of switching means;

means for individually coupling N of the accessory switches to the enabling inputs of the switching means in a selected pattern such that the manual actuation of each accessory switch is effective to operate the associated switching means;

voltage-forming means; and locking means coupled between the voltage-forming means and the junction between the first and second groups of switching means, said locking means including means coupled to the input one of the switching means in the first group for permitting enablement of said last-mentioned input switching means when the voltage relationship between said junction and said voltage forming means is in one range and for preventing enablement of said input switching means when the voltage relationship between said junction and said voltageforming means is in another range, whereby operation of said switching means in the second group before completion of operation of said switching means in the first group causes said locking means to prevent enablement of said input switching means.

11. A vehicle as in claim 10, wherein one of said switching means in the second group is connected to the vehicle starting control means.

12. In a motor vehicle:

at least N standard manually operated electrical accessory switches (N>1) distributed in the vehicle in accessible relation to an operator of the vehicle for controlling a corresponding number of standard accessories; vehicle starting control means;

circuit means coupled to said control means for energizing said control means, said circuit means including N sequentially arranged switching means each having an actuating input, said circuit means energizing said control means only when all the switching means are operated in a predetermined sequence by the energizing of their enabling inputs in a corresponding sequence, said switching means being divided into a first group of successive switching means and a second group of successive switching means, the first group of switching means being sequentially earlier than the second group of switching means;

means for individually coupling at least N of the accessory switches to the enabling inputs of the switching means in a selected pattern such that the manual actuation of each accessory switch is effective to operate the associated switching means;

first timing means coupled to said switching means and responsive to an initiating pulse for enabling an input one of said switching means and for disabling said enabled input one of said switching means after a predetermined time;

counting means coupled to said first timing means for generating a trigger pulse when a predetermined number of initiating pulses have been applied to said first timing means;

second timing means coupled to said counting means and to said first timing means and rendered effective by the trigger pulse for disabling said first timing means to deenergize said control means;

voltage-forming means; and locking means coupled between the voltage forming means and the junction between the first and second group of switching means, said locking means being associated with said first timing means and rendered effective when the voltage relationship between said junction and said voltage-forming means lies within a predetermined range for disabling said first timing means, said predetermined range being exhibited upon the operation of said switching means in the second group, before the completion of operation of said switching means in the first group.

13. In a motor vehicle:

at least N standard manually operated electrical accessory switches (N>1) distributed in the vehicle in accessible relation to an operator of the vehicle for controlling a corresponding number of standard accessories;

vehicle starting control means operable for effecting the start of said engine when a control input of said control means is enabled;

normally disabled circuit means including N sequentially arranged switching means each having an actuating input, said circuit means providing first output indication when all the switching means are operated in a predetermined sequence by the energizing of their enabling inputs in a corresponding sequence;

means for individually coupling N of the accessory switches to the enabling inputs of the switching means in a selected pattern such that the manual actuation of each accessory switch is effective to operate the associated switching means;

means for coupling the last switching means in said circuit means to the control input of said control means for applying the first output indication of said control input;

bypass means coupled to said control means and rendered effective upon the enabling of said control input for generating a second output indication; and timing means coupled to said control input and responsive to the second putout indication for maintaining said control input enabled for a predetermined time.

14. In a motor vehicle provided with (a) a normally enabled warning device, (b) an interlock system for selectively disabling the warning device wherein the interlock system includes N normally unoperated first switching means (N>1) each having an enabling input together with means for connecting all the first switching means in tandem to complete a disabling path to the warning device only when the tandem-connected first switching means have been operated in a prescribed sequence, the operation of each first switching means being effective to condition the succeeding first switching means for operation so that said succeeding first switching means may be operated upon the excitation of its enabling input, and (c) normally unoperated second switching means coupled to the input one of the tandem-connected first switching means and operable in response to an initiating pulse for conditioning the first switching means for operation, the improvement wherein:

the vehicle further comprises, in combination, at least N standard, manually operated electrical accessory switches distributed in the vehicle in accessible relation to an operator of the vehicle for controlling a corresponding number of standard accessories, and means for individually coupling N of the accessory switches to the enabling inputs of the first switching means in a selected pattern so that the manual actuation of each accessory switch by the operator is effective to operate the associated first switching means when the latter is conditioned for operation; and the second switching means includes first timing means rendered effective by the initiating pulse for disabling the conditioned input one of the first switching means after a predetermined time whereby the interlock system is prevented from enabling the activating means until the satisfactory and simultaneous completion of both a sequential testing procedure for the N accessories and the completion by the operator of N sequential manual tasks as represented by one of the above-mentioned manual switch operations.

* * * * *